United States Patent [19]

Cowan et al.

[11] Patent Number: 5,076,944
[45] Date of Patent: * Dec. 31, 1991

[54] SEEPAGE LOSS REDUCING ADDITIVE FOR WELL WORKING COMPOSITIONS AND USES THEREOF

[75] Inventors: Jack C. Cowan, Lafayette, La.; Roy F. House, Houston, Tex.; Andree' H. Harrington, Lafayette, La.

[73] Assignee: Venture Innovations, Inc., Lafayette, La.

[*] Notice: The portion of the term of this patent subsequent to Apr. 2, 2008 has been disclaimed.

[21] Appl. No.: 659,178

[22] Filed: Feb. 22, 1991

Related U.S. Application Data

[63] Continuation-in-part of Ser. No. 421,751, Oct. 16, 1989, Pat. No. 5,004,553.

[51] Int. Cl.$^5$ .............................................. C09K 7/00
[52] U.S. Cl. ................................. 507/104; 252/8.551; 175/72; 507/910
[58] Field of Search ................. 252/8.51, 8.512, 8.513, 252/8.514, 8.515, 8.551; 175/72

[56] References Cited

U.S. PATENT DOCUMENTS

| 2,319,705 | 3/1941 | Post et al. | 252/8.511 |
|---|---|---|---|
| 2,650,195 | 8/1953 | Cardwell et al. | 252/8.51 |
| 2,749,308 | 6/1956 | Beckum | 252/8.51 |
| 2,778,604 | 1/1957 | Reistle, Jr. | 166/292 |
| 2,811,488 | 10/1957 | Nestle et al. | 252/8.512 |
| 2,943,680 | 7/1960 | Scott | 252/8.512 X |
| 3,441,528 | 4/1969 | Dede, Jr. | 252/8.51 |
| 3,629,102 | 12/1971 | Lummus | 252/8.51 |
| 3,965,986 | 6/1976 | Christopher | 166/292 |
| 4,083,407 | 4/1978 | Griffin, Jr. et al. | 166/291 |
| 4,217,965 | 8/1980 | Cremeans | 175/72 |
| 4,247,403 | 1/1981 | Foley et al. | 252/8.512 |
| 4,404,107 | 9/1983 | Cowan et al. | 252/8.514 |
| 4,428,843 | 1/1984 | Cowan et al. | 252/8.51 |
| 4,474,665 | 10/1984 | Green | 252/8.51 |
| 4,531,594 | 7/1985 | Cowan | 175/72 |
| 4,670,944 | 6/1987 | Thrash | 19/58 |
| 4,732,213 | 3/1988 | Bennet et al. | 166/292 |
| 5,004,553 | 4/1991 | House et al. | 252/8.51 |

OTHER PUBLICATIONS

Handbook of Chemistry and Physics, The Chemical Rubber Publishing Co., 44th Edition, pp. 3476, 3477, (1961).

Primary Examiner—Robert L. Stoll
Assistant Examiner—Chhaya Sayala
Attorney, Agent, or Firm—Roy F. House

[57] ABSTRACT

The invention provides well working fluid compositions containing cotton burrs ground to certain particle size ranges to decrease the seepage loss of the fluid to fluid permeable formations contacted by the compositions. Also provided is a seepage loss additive comprising the ground cotton burrs in combination with one or more of ground oat hulls, ground corn cobs, hydrophobic organophilic water wettable cotton, ground citrus pulp, ground peanut shells, ground rice hulls, and ground nut shells.

10 Claims, No Drawings

SEEPAGE LOSS REDUCING ADDITIVE FOR WELL WORKING COMPOSITIONS AND USES THEREOF

This application is a continuation-in-part of patent application Ser. No. 07/421751, filed Oct. 16, 1989, now U.S. Pat. No. 5,004,553.

The invention relates to compositions for use in well-working operations such as drilling, workover and completion, packing and the like, well-working processes utilizing such compositions, and an additive to reduce the seepage loss of the compositions to the formation.

In the rotary drilling of wells for oil and gas, drilling fluids ("muds") are circulated in such a manner as to remove cuttings and to support the walls of the hole. The fluids may be either water base, comprising for example, clay, polymers, weight material and other additives dispersed in water, or oil base, comprising for example, suspending agents (generally organophilic clays), emulsifiers, stability agents, filtration control agents, weighting agents, and other additives dispersed in diesel oil and the like oleaginous mediums, all as are well known in the art.

A thin, low-permeability filter cake on the sides of the borehole is necessary to control the filtration characteristics of the drilling fluid since the pressure of the mud column in the borehole is greater than the formation pressure. A filter cake forms when the drilling fluid contains particles of a size only slightly smaller than the size of the pore openings of the formation. The liquid which enters the formation while the cake is being established, is known as the surge loss or spurt loss, while the liquid which enters after the cake is formed as the drilling fluid filtrate. The permeability of the filter cake is directly related to the particle size distribution in the drilling fluid, and, in general, the cake permeability decreases as the concentration of particles in the colloidal size range increases.

The filtration properties required for the successful completion of a well depend on the nature of the formations being drilled and on the type of drilling fluid used. Thus in water sensitive formations, oil base mud provides superior hole stabilization when the salinity of the aqueous phase of the mud is adjusted to prevent migration of water from the mud to the formation.

Both the spurt loss and filtration rate must be minimized when penetrating potentially productive formations in order to minimize any damaging effects from fluids entering the formation. These properties should also be minimized throughout the drilling process when using oil base muds because of the high cost of these muds.

When the drilling bit passes through the porous, fractured or vugular strata such as sand, gravel, shale, limestone and the like, the hydrostatic pressure caused by the vertical column of drilling fluid exceeds the ability of the surrounding earth formation to support this pressure. As a consequence drilling fluid is lost to the formation and fails to return to the surface. This loss may be any fraction up to 100% loss of the total circulating drilling fluid volume. This condition is known in the art as lost circulation. Even with the best drilling practices, circulation losses can and will occur. Loss zones can be classified as seepage loss (when the severity of the loss is 1 to 10 bbl/hr [0.16 to 1.6 m$^3$/h]), partial loss (when the severity of the loss is 10 to 500 bbl/hr [1.6 to 80 m$^3$/h]), and complete loss (when the severity of the loss is greater than 500 bbl/hr [80 m$^3$/h]).

In order to combat or prevent lost circulation, it has been common in the past to add any number of materials to the drilling fluid which act to reduce or prevent flow of the drilling fluid outwardly in a porous stratum thereby arresting a lost circulation condition. These materials are commonly referred to as lost circulation materials. Such prior known lost circulation materials include fibrous, flake, and granular materials. Representative of the organic natural products or modifications thereof that have been disclosed for use as lost circulation materials include nut and seed shells or hulls (pecan, almond, walnut, peach, brazil, coconut, peanut, sunflower, flax, cocoa bean, cottonseed, rice, linseed); crude pectate pulp; citrus pulp; beet pulp; peat moss fibers; jute; flax; mohair; lechuguilla fibers; cotton; cotton linters; wool; paper; wet-strength paper; sugar cane; bagasse; bamboo; corn stalks; sawdust; straw; wood fiber; cedar fiber; bark chips; cork; popped popcorn; dehydrated vegetable matter (suitably dehydrated carbohydrates such as citrus pulp, oatmeal, tapioca, rice grains, potatoes, carrots, beets, and various grain sorghams); the ground woody ring portion of corn cobs; whole ground corn cobs; hydrophobic, organophilic, water-wettable fibrous materials such as treated cotton, dried bagasse, and dried peat fibers; and specific mixtures of these materials. Many assorted inorganic materials have been used as lost circulation additives.

Seepage losses can occur to any type of loss zone and in any type of formation when the particles in the mud are not fine enough to complete the seal. It has been established that the maximum allowable drilling fluid loss is on the order of 1 bbl/hr [0.16 m$^3$/h], as measured in the mud pit at the surface. Remedial measures should be taken when the mud loss exceeds 1 bbl/hr [0.16 m$^3$/h].

It is an object of the present invention to provide an additive which is very effective as a seepage loss control agent in both water base and oil base well working fluids.

It is another object of this invention to provide well working compositions having a low seepage loss.

Still another object of this invention is to provide a method of decreasing the seepage loss from water base and oil base well working fluids.

These and other objects of the invention will appear to one skilled in the art as the description thereof proceeds.

In accordance with one illustrative embodiment of the invention, we have found that ground cotton burrs are effective in both oil base and water base fluids to decrease the seepage loss thereof.

Mechanically harvested cotton normally contains more foreign matter than cotton harvested by hand, necessitating more elaborate cleaning equipment at the cotton gin. When cotton arrives at the gin, it is sucked into the building through pipes that are placed in the trailers or trucks that transport the cotton. Usually it first enters driers that reduce the moisture content of the cotton for easier processing. Next the cotton travels to equipment that removes burrs, sticks, dirt, leaf trash, and other foreign matter from the cotton and cotton seeds. The term "cotton burrs" in this specification is intended to mean the composited material removed in the cotton ginning process from the cotton and cotton seeds. It includes a small amount of cotton lint. This material, which may be called "gin trash" is primarily the cotton burr which forms the outer, hard portion of the cotton ball. Thrash U.S. Pat. No. 4,670,944, incorporated herein by reference, provides further information on the nature of cotton burrs, and provides processes for the comminution and separation thereof. "Cotton burrs" and "gin trash" are used interchangeably herein.

The cotton burrs are ground to prepare the seepage loss reducing additive (hereinafter sometimes referred to as "SLRA") of this invention. The particle size distribution of the ground cotton burrs is as follows: +30 mesh<20%; 30/60=0-100%; 60/100=0-100%; 100/200=0-100%; −200=0-70%. Preferably the particle size distribution (PSD) will be either PSD #1 or PSD #2 wherein PSD #1 is as follows: +30 mesh <20%, 30/60=0-100%, 60/100=0-100%, 100/200=0-60%, −200=0-60%, and 30/100≧15%; and PSD #2 is as follows: +30 mesh<10%, 30/60=0-30%, 60/100=0-30%, 100/200<15%, and −200=0-70%. We have found that the ground cotton burrs having PSD #1 are particularly effective in combating seepage losses in weighted drilling fluids whereas the ground cotton burrs having PSD #2 are particularly effective in combating seepage losses in low solids drilling fluids. Experimental investigation of any drilling fluid with the ground burrs of PSD #1, PSD #2, and mixtures thereof will indicate the optimum material to use for the most efficient seepage loss reduction.

Typically, before the grinding of the cotton burrs to the desired particle size, the burrs and other gin trash are processed to remove small trash and sand. Thereafter the burrs (gin trash) are pulverized such as in a hammer mill. This pulverization produces a crudely ground material containing the burrs, cotton lint, and other components of the gin trash. The approximate particle size obtained from the normal hammer milling operation for the non-lint portion of the pulverized gin trash is set forth in Trash U.S. Pat. No. 4,670,944 as follows: 2% +6 mesh; 9% 6/10 mesh; 20% 10/16 mesh; 22% 16/30 mesh; 24% 30/50 mesh; 13% 50/80 mesh; 6% 80/100 mesh; 4% −100 mesh.

This crudely ground gin trash must be further processed to produce the seepage loss additive of this invention. Preferably the pulverized gin trash from the hammer mill is conditioned with steam and extruded through a die to produce pellets for further grinding. Typical pellet mills for forming such pellets are known. Generally the pellets have a diameter from about 3 millimeters to about 13 millimeters. The crudely ground gin trash is finely ground, preferably after the pelletizing operation, by passing the same through an attrition mill which is capable of grinding the burrs to the desired particle size. We have found that a Micro Pulverizer is quite suitable provided that the feed rate to the mill is controlled to give the desired particle size.

It is an aspect of this invention to chemically treat the cotton burrs to enhance the mechanical breakdown of the particles. This can be accomplished by admixing the crudely ground gin trash with an alkali metal, preferably sodium and/or potassium, hydroxide or basic salt thereof, such as carbonate, sulfite, acetate, and the like, and water or steam, and heating the thus moistened particles. Preferably this is accomplished prior to pelletizing the gin trash and the heating is accomplished in the pelletizer due to the friction heat build-up in the extrusion process. Alternatively, the gin trash can be treated with anhydrous hydrochloric acid gas as in the process disclosed for the preparation of hydrophobic, organophilic, water-wettable cotton in Cowan et al. U.S. Pat. No. 4,404,107, incorporated herein by reference. The particles treated with anhydrous hydrochloric acid gas are preferably passed to an attrition mill bypassing any pelletization equipment.

It is another aspect of this invention to mix the ground cotton burrs with a ground particulate material selected from the group consisting of oat hulls, corn cobs, rice hulls, nut shells, peanut shells, citrus pulp, hydrophobic organophilic water wettable cotton, and mixtures thereof. The ground particulate material may be first ground and then admixed with the groun cotton burrs, or the cotton burrs, either unground or ground, can be admixed with the particulate material and the admixture then ground to provide a seepage loss reducing additive of this invention.

The particulate material can be ground to a particle size distribution such that on admixing with the ground cotton burrs the SLRA has the desired particle size distribution, or the mixture can be ground together to give the desired particle size distribution. The particle size distribution of the SLRA is as follows: +30 mesh<20%, 30/60=0-100%, 60/100=0-100%, 100/200=0-60%, −200=0-60%, and 30/100≧15%; and PSD #2 is as follows: +30 mesh<10%, 30/60=0-30%, 60/100=0-30%, 100/200≧15%, and −200=0-70%.

The ground corn cobs which may be admixed with the ground cotton burrs may comprise the whole dried corn cob or it may be any portion of the corn cob, such as the woody ring portion of the corn cob. See for example Foley et al. U.S. Pat. No. 4,247,403, incorporated herein be reference.

The ground citrus pulp comprises the skin, the cells adhered to the interior of the skin, the seeds, and the stems of citrus fruit such as oranges, grapefruits, and lemons. For purposes of this invention, citrus pulp can be considered to be whatever material is left over after the useable juices, sugars, and liquors have been extracted from the citrus fruits.

The hydrophobic organophilic water wettable cotton which can be admixed with the ground cotton burrs is disclosed in Cowan et al. U.S. Pat. No. 4,404,107, incorporated herein be reference. Thus the preferred hydrophobic organophilic water wettable cotton is prepared by reacting dry hydrochloric acid gas with raw cotton, preferably a short fiber cotton, for a period of time and at a temperature sufficient to provide the cotton with the characteristics of hydrophobicity, organophilicity, and water wettability.

Different methods have been developed for particle size measurement. The most widely employed sizing method determines particle size by the degree to which a powder is retained on a series of sieves with different opening dimensions. This technique is straightforward and requires simple equipment, but without attention to detail it can lead to erroneous results. The sieves, particularly those with the finer meshes, are damaged by careless handling. They tend to become clogged with irregularly shaped particles unless agitated, but distorted if agitated too much. Furthermore, it is always a concern to determine when all particles that might pass through a sieve have done so.

A typical sieve is a shallow pan with a wire mesh bottom or an electroformed grid. Opening dimensions in any mesh or grid are generally uniform within a few percent. Sieves are available with opening from 5 microns in several series of size progression. Woven wire-mesh sieves have approximately square openings whereas electroformed sieves have round, square, or rectangular openings. Wire sieves tend to be sturdier and less expensive, and have a greater proportion of open area. They are much more frequently employed than are electroformed sieves except in the very fine particle range where only electroformed sieves are available.

Dry-sieving is typically performed with a stack of sieves with openings diminishing in size from the top downward. The lowest pan has a solid bottom to retain the final undersize. Powders are segregated according to size by placing the powder on the uppermost sieve and then shaking the stack manually, with a mechanical vibrator, or with air pulses of sonic frequency until all particles fall onto sieves through which they are unable to pass or into the bottom pan. In another device, sieves are employed one at a time within a container from which passing particles are captured by a filter. Agitation on the sieve is provided by a rotating air jet. The material retained by the sieve is recovered and recycled with the next coarser sieve until all of the powder is exposed to the desired series of sieves or all material passes.

Wet-sieving is performed with a stack of sieves in a similar manner except that water or another liquid that does not dissolve the material, is continually applied to facilitate particle passage. A detergent is frequently added to promote particle dispersion. This enhanced dispersion is almost essential for fine-particle analysis, because under dry conditions, electrostatic and surface forces greatly impede clean passage and isolation of sizes. A partial vacuum is sometimes applied to fine-particle sieving. Ultrasonic energy dislodges irregular particles trapped in sieve openings provided it is used at moderate density; a maximum of 0.45 W/cm$^2$ at a frequency of 40 kH$_z$ has been recommended.

The particle mass retained by each sieve is determined by weighing, after drying when necessary, and each fraction is designated by the sieve size it passed and the size on which it was retained.

The particle size, for the purposes of this invention, is determined after the seepage loss reducing additive is admixed with 3% by weight of a fine, particulate silica flow control agent, preferably fumed silica. We have determined that dry sieving of the ground cotton burrs, and other materials having an elongated particle shape, i.e., acicular or fibrous particles, without the silica causes the finer particles to agglomerate resulting in an indicated particle size distribution which is larger than the actual dry particle size.

The fumed silica is a well known commercially available product obtained by the vapor phase hydrolysis of silicon tetrachloride at ultra high temperatures.

The well working compositions of our invention can be prepared by adding the SLRA to the water base or oil base well working fluid. A water base well working composition will generally contain a suspending agent, such as clay or polymer, weight material which may be insoluble, such as barite, siderite, galena, ilmenite, hematite, and the like, or which may be a soluble salt such as sodium chloride, potassium chloride, calcium chloride, calcium bromide, zinc bromide and the like, fluid loss additives such as starch, CMC, carboxymethyl starch, polyacrylates and other polymers, and other additives such as viscosity control agents, oil, lubricants, emulsifiers, lost circulation materials and other functional additives. Oil base well working fluids will generally contain additives which provide these same functions, with the exception of the lubricants. Representative suspending agents are the organophilic clays. Representative weight materials are the insoluble materials enumerated above. Representative fluid loss control additives are asphaltic materials, organophilic humates, organophilic lignosulfonates, polymers and the like. Representative emulsifiers are calcium soaps, such as calcium tallate, fatty amides, partial fatty amides of polyamines, and the like.

The amount of the SLRA of this invention added to the well working fluid needs only to be an amount which is effective in reducing the seepage loss to the desired extent. Generally, the more additive added, the greater the seepage loss reduction. Preferably, there is added from about 1 ppb to about 50 ppb of the SLRA, most preferably from about 3 ppb to about 20 ppb.

Another embodiment of our invention is a process to decrease the seepage loss or spurt loss of a well working fluid, particularly drilling fluids, which comprises adding to the well working fluid a quantity of the SLRA of this invention sufficient to effect such decrease. Generally, there will be required from about 1 pound per 42 gallon barrel (ppb) to about 50 ppb, preferably from about 3 ppb to about 20 ppb.

The seepage loss reducing additive of this invention may be added to the well working fluids, either aqueous-base or oil base, utilizing the slugging technique disclosed in Cowan et al. U.S. Pat. No. 4,531,594, incorporated herein by reference. Thus a concentrated "pill" of about 20–50 bbl total volume can be made by mixing from about 15 ppb to about 50 ppb of the SLRA in the well-working fluid. The pill will preferably contain from about 15 ppb to about 40 ppb of the SLRA. The pill may be formulated to also contain a fluid loss reducing additive as disclosed in U.S. Pat. No. 4,531,594. Typical fluid loss reducing additives and typical methods of employing the pill are set forth in U.S. Pat. No. 4,531,594. For aqueous base drilling fluids, well known fluid loss additives may be added to the pill. Alternatively, a fluid loss reducing additive may be admixed with the SLRA before mixing the pill.

The seepage loss reducing additive of this invention can be mixed with materials having a larger particle size distribution and the mixture used to combat larger losses of the fluid to the formations being drilled. Alternatively, the SLRA can be added separately to a drilling fluid in which a material having a larger particle size distribution is also added.

A high boiling point liquid hydrocarbon of the type used in well working fluids, such as diesel oil, low toxicity mineral oil, etc., can be added to aqueous base well working fluids containing the SLRA of this invention or to which the SLRA is to be added. The SLRA sorbs the hydrocarbon and concentrates it on the sides of the well thus generally further decreasing the seepage loss from the well working fluid. Alternatively, a liquid hydrocarbon can be sorbed onto the SLRA of this invention to provide a particulate additive having enhanced seepage loss reducing characteristics and lubricating characteristics. In well working fluids which contact potential oil and gas producing formations, a suitable organic liquid can be substituted for the liquid hydrocarbon such that the organic liquid will not interfere with the hydrocarbon analysis of the formations.

Preferably the hydrocarbon/organic liquid is present in the well working fluid or in admixture with the SLRA in an amount to provide a weight ratio of the hydrocarbon/organic liquid to the seepage loss reducing agent from about 0.1/1 to about 2/1, most preferably from about 0.15/1 to about 1/1. The hydrocarbon/organic liquid may be present in the drilling fluid in concentrations in excess of the amount which can be sorbed by the SLRA of this invention.

The SLRA of this invention can be used as a carrying agent for gilsonite or other asphaltene-type material to stabilize troublesome shale section in a well. Since gilsonite is not water soluble or dispersible, a wetting agent should be admixed with the gilsonite/seepage loss additive composite material to ensure adequate dispersion of the gilsonite in the aqueous base drilling fluid. Preferred wetting agents are non-ionic surfactants such as polyethoxylated alcohols, alkyl phenols, and the like organic materials which contain at least one hydroxyl group and a large hydrocarbon radical within their molecular structure.

Gilsonite and asphaltic-type materials have been used to stabilize sloughing shales to reduce borehole erosion. It is theorized that the gilsonite penetrates the shale pore spaces, microfractures, and bedding planes of the shale as the drill bit penetrates the formation. Presumeably the gilsonite extrudes into the pores, fractures, and bedding planes to reduce or minimize filtrate and whole mud invasion and thus bond the matrix to prevent sloughing. The SLRA of this invention then functions to bridge across the surface of the shale reducing the seepage of the drilling fluid into the formation. The fluid loss control agent in the drilling fluid enables the drilling fluid to form an impermeable filter cake on the sides of the borehole thus minimizing the loss of fluid to the formations contacted by the drilling fluid.

A crosslinkable polymer can be admixed with the SLRA to form a plugging agent for boreholes experiencing gross lost circulation of whole mud to the formation, i.e., circulation losses greater than about 10 bbl/hr. The polymer blend will be added to either an aqueous liquid or an oleaginous liquid, depending on the properties of the polymer, at a concentration of about 10 ppb to about 75 ppb. Thereafter a crosslinking additive will be added, and the plugging liquid pumped as a "pill" or "slug" to the zone of lost circulation in the well. The type of crosslinking additive and its concentration is chosen such that the plugging liquid forms a rubbery, semi-solid mass by the time that it reaches the lost circulation zone.

Suitable water soluble or water dispersible polymers for use in aqueous liquids are polymers containing hydroxyl groups located on adjacent carbon atoms in the cis configuration, as is well known in the art. Suitable polysaccharides are disclosed in Walker U.S. Pat. No. 3,215,634, incorporated herein by reference. Dihydroxypropyl-modified polysaccharides as disclosed in Sandy et al. U.S. Pat. No. 4,649,999, incorporated herein by reference, as is polyvinylalcohol (see Savins U.S. Pat. No. 3,299,952, incorporated herein by reference). Suitable crosslinking additives for these polymers are borate-yielding compounds such as those disclosed in the aforesaid patents and Mondshine U.S. Pat. No. 4,619,776, incorporated herein by reference. Other crosslinkable polymers and crosslinking additives therefore are given in the following U.S. patents, incorporated herein by reference: Hodge—U.S. Pat. No. 4,657,081; Kucera—U.S. Pat. No. 4,692,254; Sydansk et al.—U.S. Pat. No. 4,722,397; Hanlon et al.—U.S. Pat. No. 4,767,550.

In order to more completely describe the invention, the following non-limiting examples are given. In these examples and throughout this specification, the following abbreviations may be used: ppb=1b per 42 gallon barrel; ppg=1b per gallon; sec=seconds; min=minutes; G.S.=gel strength; vol=volume; API=American Petroleum Institute; °F.=degree farenheit; SLRA=seepage loss reducing additive; H.R.=hot roll; cp=centipoise; sq.ft.=square feet; cc=cubic centimeters; CFL=complete fluid loss; AV=apparent viscosity, cp; YP=yield point, 1b/100 sq.ft.; wt=weight. All mesh sizes used in the description of the invention are in terms of U.S. Standard Sieve Series, Fine Series of 1940. A particle size designated $+X$ indicates the particles were retained on a sieve of size X mesh. A particle indicated Y/Z indicates that the particles passed through a sieve of mesh size Y and were retained on a sieve of mesh size Z. A particle size designated-W indicates that the particles all passed through a sieve of mesh size W.

The particle size distribution of the various samples evaluated in the Examples is set forth in Table I. All percentages throughout the Tables, Examples, and this specification are weight percent unless otherwise indicated.

The particle size of the various samples was determined using the following procedure: A series of sieves of varying mesh sizes (U.S. Standard Sieve Series) with openings diminishing in size from the top downward were stacked over a solid bottom pan. The samples were admixed with 3% by weight fumed silica (CAB-O-SIL M5), placed on the top sieve, covered, placed on a RO-TAP sieve shaker, and shaken for 10 minutes. The weight of sample retained on each sieve was determined and the % by weight of sample on each sieve calculated.

The size of the sieve openings in micrometers (microns) for the various sieve mesh sizes set forth herein are as follows: 30 mesh=590 microns, 60 mesh=250 microns, 100 mesh=149 microns, and 200 mesh=74 microns. Thus a particle size designation of $+30$ mesh indicates that the particles are >590 microns (greater than 590 microns). A particle size designation of 30/60 mesh indicates that the particles are <590 microns (less than 590 microns) and >250 microns. A particle size of 60/100 mesh indicates that the particles are <250 microns and >149 microns. A particle size of 100/200 mesh indicates that the particles are <149 microns and >74 microns. A particle size of $-200$ mesh indicates that the particles are <74 microns. A particle size of 30/100 mesh indicates that the particles are <590 microns and >149 microns.

TABLE I

| Sample | Particle Size Distribution, wt. % U.S. Standard Sieve Series | | | | |
|---|---|---|---|---|---|
| | +30 | 30/60 | 60/100 | 100/200 | −200 |
| Ground Burrs No. 1 | 0.3 | 9.7 | 17.4 | 26.3 | 46.3 |
| Ground Burrs No. 2 | 0.6 | 15.4 | 25.0 | 25.2 | 33.8 |
| Ground Burrs No. 3 | 1.3 | 23.5 | 20.4 | 20.7 | 34.1 |
| Ground Burrs No. 4 | 15.4 | 27.4 | 13.1 | 12.8 | 31.3 |
| Ground Burrs No. 5 | 6.1 | 32.0 | 19.9 | 17.6 | 24.4 |

EXAMPLE 1

Various samples of the ground burrs set forth in Table I were evaluated as seepage loss additives at the concentration indicated in Table A in a weighted clay base aqueous drilling fluid containing 23 ppb API grade bentonite, 1.85 ppb chrome-lignosulfonate, 1.85 ppb of a 20% by weight solution of NaOH, and 111 ppb API grade barite in fresh water.

After preparation of the drilling fluid samples, the initial API RP 13B rheology was obtained; the samples together with a sample of the untreated drilling fluid were hot rolled in an oven for 16 hours at 150° F.; the samples cooled and mixed 10 minutes; and the API RP 13B rheology obtained. The ability of the fluids to seal off a porous sand was evaluated in the following manner: 200 grams of a 16/30 mesh frac sand were placed in a standard API filter press with a 20 mesh AZO screen in place of the API screen and filter paper; water was added, and the water drained by blowing nitrogen gas through the sand; about 1 bbl equivalent of a fluid sample was added to the API cell and 100 psi differential pressure was applied as in the standard API fluid loss test; thereafter, the fluid which seeped through the sand pack was caught until the sand pack was sealed, i.e., when only drops of fluid emerged from the sand pack. The volume of the fluid which seeped through the sand pack and the time to form the seal were measured. The data obtained are given in Table A.

EXAMPLE 2

The sample of Ground Burrs No. 1 was evaluated as a seepage loss additive at a concentration of 6, 10, and 15 ppb in a low solids polymer well working fluid containing 3 ppb Kelzan XCD biopolymer, 4 ppb pregelatinized potato starch, and fresh water. The sand pack tests were conducted as in Example 1 except there were used 300 grams of a 50/70 mesh frac sand, and the standard API screen was used in place of the AZO screen. The data obtained are given in Table B.

TABLE A

| Seepage Loss Reducing Additive | ppb SLRA | APIRP 13B Rheology | | | | Seepage Loss Shut-Off | |
|---|---|---|---|---|---|---|---|
| | | Initial | | After Hot-Roll | | | |
| | | Apparent Viscosity | Yield Point | Apparent Viscosity | Yield Point | Time sec. | Vol. cc. |
| None | 0 | 27 | 8 | 39 | 8 | CFL | |
| No. 1 | 6 | 33.5 | 13 | 51 | 16 | 6 | 22 |
| No. 2 | 6 | 39 | 12 | 34 | 9 | 5.5 | 19 |
| No. 2 | 10 | 41 | 7 | 45 | 20 | 6 | 11 |
| No. 3 | 10 | 32 | 22 | 50 | 26 | 3 | 5 |
| No. 4 | 6 | 40 | 15 | 52.5 | 19 | 9 | 36 |
| No. 5 | 5 | 38 | 10 | 31 | 7 | 8 | 29 |

TABLE B

| Seepage Loss Reducing Additive | ppb SLRA | Initial Properties | | Seepage Loss Shut-Off | |
|---|---|---|---|---|---|
| | | APIRP 13B Rheology | | | |
| | | Apparent Viscosity | Yield Point | Time sec. | Vol. cc. |
| None | 0 | 35.5 | 43 | CFL | |
| No. 1 | 6 | 40.5 | 49 | 28 | 92 |
| No. 1 | 10 | 45.5 | 65 | 7 | 28 |
| No. 1 | 15 | 56 | 64 | 7 | 22 |

EXAMPLE 3

Various samples of the ground burrs set forth in Table I were evaluated as a seepage loss additive at 10 ppb in the low solids polymer drilling fluid of Example 2. After hot rolling the drilling fluids for 16 hours at 150° F., they were evaluated as in Example 2. The data obtained are given in Table C.

EXAMPLE 4

A sample of the ground burrs was fractionated into various fractions as indicated in Table D. These fractions were evaluated at the concentrations indicated in Table D in a weighted clay base drilling fluid containing 23 ppb API grade bentonite, 1.85 ppb chrome-lignosulfonate, 1.85 ppb of a 20% by weight solution of NaOH, and 111 ppb API grade barite in fresh water. The ability of the fluids to seal off a porous sand was evaluated as in Example 1. The data obtained are given in Table D.

TABLE C

| Seepage Loss Reducing Additive | ppb SLRA | After Hot-Roll @ 150° F., 16 hr | | | |
|---|---|---|---|---|---|
| | | APIRP 13B Rheology | | Seepage Loss Shut-Off | |
| | | Apparent Viscosity | Yield Point | Time sec. | Vol. cc. |
| No. 1 | 10 | 15 | 38 | 9 | 40 |
| No. 2 | 10 | 17 | 50 | 9 | 43 |
| No. 3 | 10 | 18 | 63 | 9 | 46 |

TABLE D

| ppb Ground Burrs | | | | Seepage Loss Shut-Off | | Total* |
|---|---|---|---|---|---|---|
| 30/60 | 60/100 | 100/200 | −200 | Time sec. | Vol. cc. | Vol. cc. |
| — | — | — | — | CFL | | |
| 3 | — | — | — | 9 | 10 | 19 |
| 2 | — | — | — | 9 | 95 | 104 |
| 1 | — | — | — | 13 | 124 | 137 |
| — | 4 | — | — | 4 | 9.5 | 19 |
| — | — | 5 | — | 9 | 200 | CFL |
| — | — | — | 5 | 12 | 200 | CFL |
| — | 5 | 5 | — | 3 | 6 | 15 |
| 1 | 4.5 | 4 | 0.5 | 3 | 6 | 16 |
| 1 | 4 | 1 | 4 | 2 | 12.5 | 21.5 |
| — | 3.5 | 3 | 3.5 | 5 | 15 | 23.5 |
| 3 | 3.5 | 2.5 | 1 | 3 | 5 | 15 |
| 2 | 3.5 | 2.5 | 2 | 3 | 6 | 13.5 |
| 1.25 | 1.25 | — | 2.5 | 7 | 19 | 31 |
| 1.25 | 1.25 | 2.5 | — | 6 | 20 | 33 |
| 0 | 2.5 | 0 | 2.5 | 6 | 22 | 36 |
| 0 | 2.5 | 2.5 | 0 | 6 | 14 | 29 |
| 2.5 | 0 | 0 | 2.5 | 8 | 57 | 70 |
| 2.5 | 0 | 2.5 | 0 | 6 | 28 | 40 |

*After 30 minutes

EXAMPLE 5

Samples of the fractionated ground burrs were evaluated at the concentrations indicated in Table E in the low solids polymer drilling fluid of Example 2. The ability of the fluids to seal off a porous sand was evaluated as in Example 2. The data obtained are given in Table E.

TABLE E

| ppb Ground Burrs | | | | | Seepage Loss Shut-Off | | Total* |
|---|---|---|---|---|---|---|---|
| +30 | 30/60 | 60/100 | 100/200 | −200 | Time sec. | Vol. cc. | Vol. cc. |
| — | — | — | 5 | — | 35 | 84 | 95 |
| — | — | — | 10 | — | 7 | 19 | 31.5 |
| — | — | 5 | — | — | 19 | 185 | CFL |
| — | — | — | — | 10 | 15 | 190 | CFL |
| — | — | — | 5 | 5 | 16 | 35 | 45 |
| — | — | 2.5 | .5 | 2.5 | 16 | 32 | 44 |
| — | — | 5 | 2.5 | 2.5 | 15 | 35 | 52 |
| — | — | 2 | 8 | — | 10 | 31 | 45 |

TABLE E-continued

| | ppb Ground Burrs | | | | Seepage Loss Shut-Off | | Total* |
| | | | | | Time | Vol. | Vol. |
| +30 | 30/60 | 60/100 | 100/200 | −200 | sec. | cc. | cc. |
| 0.03 | 0.7 | 1.22 | 2.69 | 5.36 | 3 | 7 | 27 |

*After 30 minutes

What is claimed is:

1. An additive for decreasing the seepage loss of fluid from a well working fluid in contact with a fluid permeable formation which comprises ground cotton burrs having a particle size distribution as follows: >590 microns <20%, <590 microns and >250 microns=0%-100%, <250 microns and >149 microns=0%-100%, <149 microns and >74 microns=0%-100%, and <74 microns=0%-70%, wherein the particle size is determined by dry sieve analysis after admixing the ground cotton burrs with 3% by weight of fumed silica.

2. The additive of claim 1 having a particle size distribution as follows: >590 microns <20%, <590 microns and >250 microns=0%-100%, <250 microns and >149 microns=0%-100%, <149 microns and >74 microns=0%-60%, <74 microns=0%-60%, and <590 mesh and >149 mesh ≧15%.

3. The additive of claim 1 having a particle size distribution as follows: >590 microns <10%, <590 microns and >250 microns=0%-30%, <250 microns and >149 microns=0%-30%, <149 microns and >74 microns ≧15%, and <74 microns=0%-70%.

4. An additive for decreasing the seepage loss of fluid from a well working fluid in contact with a fluid permeable formation which comprises a mixture of from about 1% to about 99% by weight ground cotton burrs and from about 1% to about 99% by weight of a particulate material selected from the group consisting of ground oat hulls, ground corn cobs, hydrophobic organophilic water wettable cotton, ground citrus pulp, ground peanut shells, ground rice hulls, ground nut shells, and mixtures thereof, wherein the additive has a particle size, determined by dry sieve analysis after admixing the additive with 3% by weight of fumed silica, as follows: >590 microns <20%, <590 microns and >250 microns=0%-100%, <250 microns and >149 microns=0%-100%, <149 microns and >74 microns=0%-100%, and <74 microns=0%-70%.

5. The additive of claim 4 having a particle size distribution as follows: >590 microns <20%, <590 microns and >250 microns=0%-100%, <250 microns and >149 microns=0%-100%, <149 microns and >74 microns=0%-60%, and <590 microns and >149 microns ≧15%.

6. The additive of claim 4 which has a particle size distribution as follows: >590 microns <10%, <590 microns and >250 microns=0%-30%, <250 microns and >149 microns=0%-30%, <149 microns and >74 microns ≧15%, and <74 microns=0%-70%.

7. The additive of claim 4, 5, or 6, which comprises a mixture of from about 50% to about 95% by weight ground cotton burrs and from about 5% to about 50% by weight particulate material.

8. A drilling fluid comprising as a major constitutent an oily petroleum liquid and sufficient of the seepage loss additive of claim 1, 2, 3, 4, 5 or 6 to decrease the seepage loss of said drilling fluid.

9. A drilling fluid comprising as a major constituent an aqueous liquid and sufficient of the seepage loss additive of claim 1, 2, 3, 4, 5, or 6 to decrease the seepage loss of said drilling fluid.

10. A process of reducing the seepage of a well working fluid into a permeable formation contacted by the fluid which comprises adding to the well working fluid a quantity of the seepage loss additive of claim 1, 2, 3, 4, 5, or 6 sufficient to effect such reduction.

* * * * *

UNITED STATES PATENT AND TRADEMARK OFFICE
CERTIFICATE OF CORRECTION

PATENT NO. : 5,076,944
DATED : December 31, 1991
INVENTOR(S) : Jack C. Cowan, Roy F. House, Andree' H. Harrington It is certified that error appears in the above-identified patent and that said Letters Patent is hereby corrected as shown below:

Column 11, line 27, in Claim 2, "mesh", each occurrence, should read -- microns --.

Column 12, line 14, after "microns = 0% - 60%," insert -- <74 microns = 0% - 60%, --.

Signed and Sealed this

Fourteenth Day of September, 1993

Attest:

BRUCE LEHMAN

Attesting Officer

Commissioner of Patents and Trademarks